(12) United States Patent
Caldwell et al.

(10) Patent No.: US 7,646,745 B2
(45) Date of Patent: *Jan. 12, 2010

(54) SYSTEM AND METHOD FOR OPERATING A MOBILE DEVICE, SUCH AS PROVIDING AN OUT OF BOX CONNECTION SYSTEM FOR UMA TYPE MOBILE DEVICES

(75) Inventors: Christopher Caldwell, Woodinville, WA (US); Janne Linkola, Espoo (FI); Jasdeep Chugh, Renton, WA (US); James Hsu, Bothell, WA (US); Jelena Senour, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 325 days.

This patent is subject to a terminal disclaimer.

(21) Appl. No.: 11/480,821

(22) Filed: Jun. 30, 2006

(65) Prior Publication Data
US 2008/0002609 A1    Jan. 3, 2008

(51) Int. Cl.
*H04W 4/00* (2009.01)
(52) U.S. Cl. .................. 370/328; 370/230; 370/329; 370/490; 455/435.3; 455/566
(58) Field of Classification Search .................. 370/328, 370/230, 318, 329, 331, 338, 352, 401, 490; 455/414.1, 435.3, 450, 456.1, 566
See application file for complete search history.

(56) References Cited

U.S. PATENT DOCUMENTS

| 5,475,677 | A  | * | 12/1995 | Arnold et al. ............... 370/280 |
| 7,369,850 | B2 | * | 5/2008 | Andrew et al. ........... 455/435.1 |
| 2004/0204133 | A1 | | 10/2004 | Andrew et al. |
| 2005/0197156 | A1 | | 9/2005 | Fourquin et al. |
| 2006/0052113 | A1 | | 3/2006 | Ophir et al. |
| 2006/0095954 | A1 | * | 5/2006 | Buckley et al. ................ 726/2 |

FOREIGN PATENT DOCUMENTS

| EP | 0781064 A | 6/1997 |
| EP | 1420569 A | 5/2004 |
| WO | WO-9740638 A | 10/1997 |

* cited by examiner

*Primary Examiner*—Matthew D Anderson
*Assistant Examiner*—Shaima Q Aminzay
(74) *Attorney, Agent, or Firm*—Perkins Coie LLP

(57) ABSTRACT

Methods and systems are disclosed to enable users of mobile devices to have an easy out of the box experience. In some examples, during the initial powering on of a mobile device, subsequent powering on of the mobile device, or at user direction, the device queries a user about connecting to an alternate wireless access network supported by the mobile device and upon receiving an indication from the user of the mobile device to proceed with the connection to the alternate wireless access network, connects the mobile device to an alternate wireless access network.

24 Claims, 15 Drawing Sheets

SYSTEM AND METHOD FOR OPERATING A MOBILE DEVICE, SUCH AS PROVIDING AN OUT OF BOX CONNECTION SYSTEM FOR UMA TYPE MOBILE DEVICES

BACKGROUND

3GPP, or the 3rd Generation Partnership Project, is a collaboration agreement that was established in December 1998 between various organizations including: ETSI (Europe), ARIB/TTC (Japan), CCSA (China), ATIS (North America) and TTA (South Korea). The scope of 3GPP was to make a globally applicable third generation (3G) mobile phone system specification. Global System for Mobile Communications (GSM) is the most popular standard for mobile phones in the world. The 3GPP specifications are based on the evolution of the GSM specifications, now generally known as the UMTS (Universal Mobile Telecommunications System).

Unlicensed Mobile Access (UMA) lets wireless service providers merge cellular networks and IP-based wireless networks into one seamless service with one mobile device, one user interface, and a common set of network services for both voice and data. The UMA solution converges cellular networks with any IP-based wireless access network, such as IEEE 802.16 (WiMAX) networks, IEEE 802.20 Mobile Broadband Wireless Access (MBWA), Ultra Wideband (UWB) networks, 802.11 wireless fidelity (Wi-Fi) networks, and Bluetooth networks. UMA has recently been accepted into release 6 of the 3GPP standard as a General Access Network (GAN).

With UMA or GAN, subscribers may move between the cellular networks and IP-based wireless networks with seamless voice and data session continuity as transparently as they move between cells within the cellular network. Seamless in-call handover between the IP-based wireless network and cellular network ensures that the user's location and mobility do not affect the services delivered to the user. The subscriber experiences service, location, and mobility transparency. Services may be identical when connected over the IP-based wireless network or the cellular network.

UMA effectively creates a parallel radio access network, the UMA network (UMAN), which interfaces to the mobile core network using existing mobility-enabled, standard interfaces. The mobile core network remains unchanged. The common mobile core network makes it possible to deliver full service and operational transparency. The existing service provider Business Support Systems (BSS), service delivery systems, content services, regulatory compliance systems, and Operation Support Systems (OSS) can support the UMA network without change. Service enhancements and technology evolution of the mobile core network apply transparently to both the cellular access and UMA networks.

As implementation of the technology expands, wireless service providers may face new obstacles. Users of dual mobile devices (such as those capable of functioning on both GSM and UMA networks) may dismiss the UMA wireless option as being unnecessary or may simply not be aware of such an option. Additionally, users typically feel a level of uncertainty in embracing new technologies. Therefore, wireless service providers may want to educate their subscribers about the existence and benefits of such technologies. These and other problems exist with respect to integrating wireless technology, such as UMA technology, into mobile devices.

BRIEF SUMMARY OF THE INVENTION

Not Applicable.

DETAILED DESCRIPTION

Figure 1A:
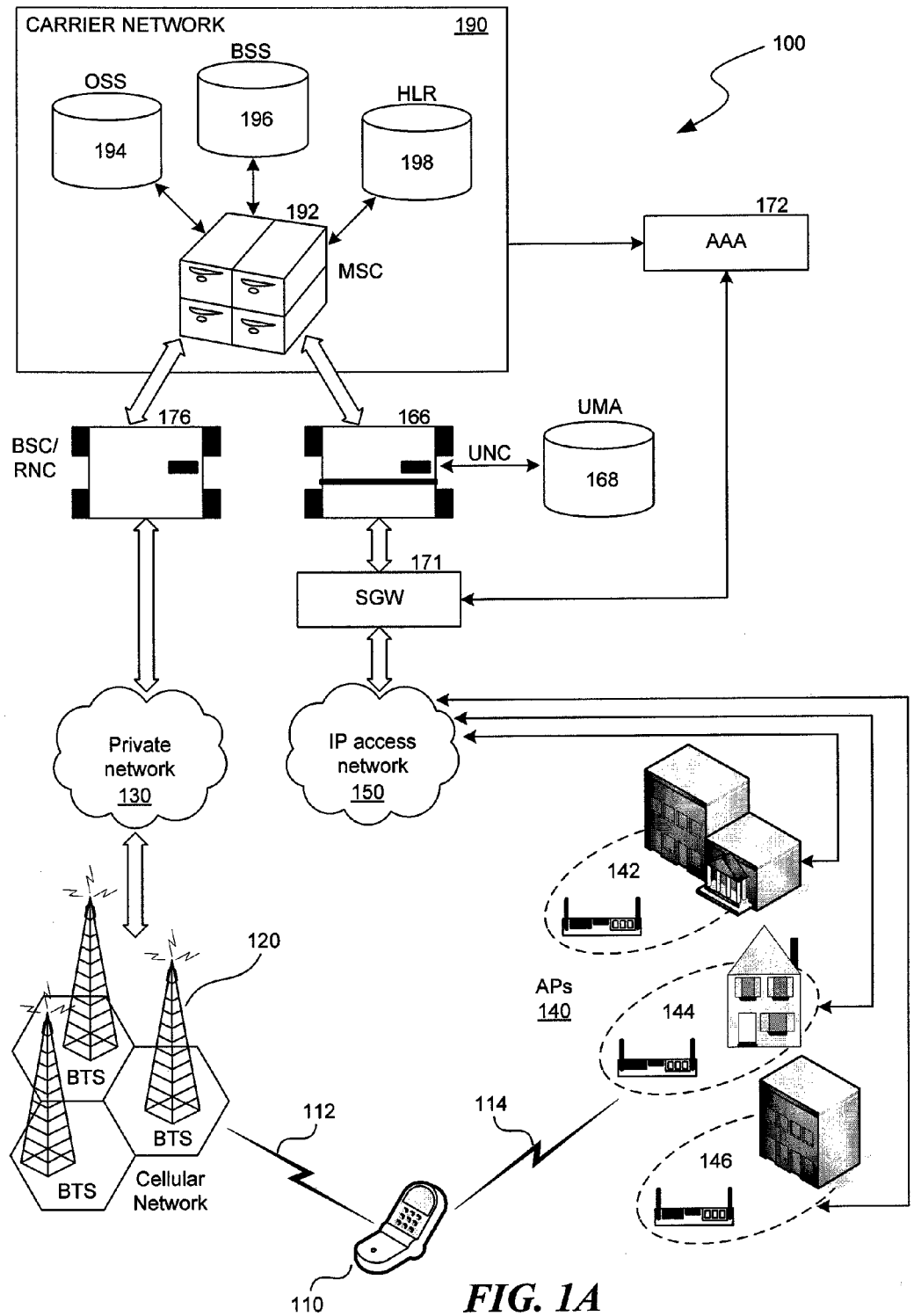
FIGS. 1A and 1B illustrate example systems that combine a cellular telephone network with a UMA network.

The technology will now be described with respect to various embodiments. The following description provides specific details for a thorough understanding of, and enabling description for, these embodiments of the technology. However, one skilled in the art will understand that the technology may be practiced without these details. In other instances, well-known structures and functions have not been shown or described in detail to avoid unnecessarily obscuring the description of the embodiments of the technology.

It is intended that the terminology used in the description presented below be interpreted in its broadest reasonable manner, even though it is being used in conjunction with a detailed description of certain specific embodiments of the technology. Certain terms may even be emphasized below; however, any terminology intended to be interpreted in any restricted manner will be overtly and specifically defined as such in this Detailed Description section.

A system and method for providing users of wireless enabled mobile devices with an easy "out of the box" or initialization experience is disclosed. In some embodiments, a new mobile device (such as a mobile phone) contains a database of one or more alternate wireless networks to connect the mobile device to a UMA network and a tutorial about the use and capabilities of the UMA mode of the device. For example, upon an initial powering on of the mobile device, the system may query a user of the mobile device as to the user's interests in using the device's UMA mode. The initial powering on of the mobile device may be the first time the mobile device is powered on (e.g., just "out of the box"), or may be one of the first several times the mobile device is powered on.

If the user wishes to continue with the UMA, the device may provide the user with a tutorial aimed at educating the user about the functionality of UMA type devices. The device will then attempt to connect to an alternate available network, such as one of the networks already stored in the mobile device. If the user does not wish to continue in UMA mode (e.g., the user desires to make cellular calls before learning about the device's alternate connection capabilities), the system may provide the user with one or more options regarding later instruction or use of the UMA mode.

Such devices may be preprogrammed to facilitate the ease of transition of a user into the UMA mode. The system provides users with a mobile device able to initially connect to many different access points. For example, the mobile device may be preprogrammed to match to any networks containing a "TMOHSxxxx" identification, where the x is a wildcard character that may be any hexagonal character. Thus, the mobile device can access a network identified as "TMOHS2344" or "TMOHS7865" or any network that starts with "TMOHS."

Additionally, the system may provide a mobile device with network search techniques that enable the device to connect to any available alternate networks, such as preprogrammed networks, open networks, or closed networks. The search technique may further prioritize any found available networks in accordance with various standards, and connect to an alternate network given the highest priority. Additionally, the system may query a user to add any identification information related to found alternate networks or to an alternate network list stored within the mobile device. The search technique may prioritize networks a number of ways, including giving priority to networks stored in the mobile device. The ability to quickly and easily connect a mobile device to a high quality network may further provide a user with a positive out of box experience.

Example UMA Network

Unlicensed Mobile Access (UMA) allows cellular service providers to offer their products and services seamlessly over Internet-connected broadband networks. Cellular phones may use a cellular network, as well as any IEEE 802.16 (WiMAX) networks, IEEE 802.20 Mobile Broadband Wireless Access (MBWA), Ultra Wideband (UWB) networks, 802.11 wireless fidelity (Wi-Fi) networks, and Bluetooth networks, and so on, to access points that are then connected to DSL (Digital Subscriber Line) or cable modems, or some other broadband Internet connections such as in a subscriber's home or access points in public or corporate areas that have Internet connectivity. Thus, mobile devices may connect to and access licensed spectrums (such as spectrums for cellular communications) and alternate licensed and unlicensed spectrums (such as via an UMA access point).

One point of UMA is "abstraction." A cellular service provider's systems that deliver content and handle mobility may not be aware that a subscriber's mobile device is on a UMA network. The system may instead assume the mobile device is on a GSM network just like any other. Thus, the IP network is abstracted with respect to the cellular network, regardless of whether, for example, the mobile device connects to the cellular network via a base station (for licensed spectrum access) or a wireless access point (for unlicensed spectrum access).

A non-exhaustive list of products and services available on UMA includes not only voice services, but also supplementary services like call forwarding and call waiting, text messaging services like SMS, and data-based services like ringtone downloads, game downloads, picture messaging, email and web browsing. Further, since a mobile device is connected to an IP network, all manner of data services available over such networks may be provided to the mobile device.

Instead of using towers broadcasting on licensed spectrum, UMA takes the familiar GSM system protocol, encapsulates it into Internet protocol (IP) packets and uses the Internet as a transport to deliver those to the cellular service provider's mobile core network, thus bypassing the existing network of radio towers. Because GSM protocols are used both in the traditional radio tower and the IP network, the cellular service provider maintains a large degree of system compatibility while using the Internet to provide its services.

FIG. 1A is an illustration of a system 100 that combines a cellular telephone network with a UMA network. The described system 100 is arranged to accept registration requests and call connections from a mobile subscriber (MS) or mobile device 110 to either a cellular telephone network or to a UMA network.

The example cellular telephone network includes one or more base transceiver stations (BTS) 120 that are configured to accept cellular communications 112 from mobile device 110. The private network can include a variety of private connections such as T1 lines, a wide area network (WAN), a local area network (LAN), various network switches, to name a few. BSC/RNC 176 controls network communication traffic to the carrier network 190, where all communications are managed. An example carrier network 190 includes a mobile switching center (MSC) 192, which is arranged as part of the core network for the carrier to control data/call flows, perform load balancing, as well as other functions. A variety of databases are also accessed in the carrier network such as, e.g., OSS 194, BSS 196, and HLR 198, for billing, call logging, etc. The example UMA network includes an access point (AP) 140 or multiple access points that are arranged to accept IP communications 114 from mobile device 110. AP 140 can be configured as part of a wireless network in one or more locations such as a public network 142, a home network 144, or a private business network 146. Each access point (AP) is coupled to an Internet protocol (IP) network 150 through a broadband connection. Most access points in a home setting also include IP-routing capabilities. IP Network 150 is arranged to route IP packets that carry UMA communications (data, voice, SMS, etc.) between the APs and the security gateway (SGW) 171. The security gateway controls access to the UMA network controller (UNC) 166, which is arranged to communicate with a UMA database (UMA dB) 168 for logging and accessing various data associated with UMA communications. UNC 166 is also arranged to communicate with the carrier network 190 similar to the BSC/RNC.

Authentication is handled by the security gateway (SGW) 171, which is arranged to communicate with an authentication and access authorization (AAA) module 172 as shown in FIG. 1A. Challenges and responses to requests for access by a mobile device 110 are communicated between HLR database 198 and the AAA module 172. When authorization is granted, SGW 171 is arranged to communicate the assignment of a GAN IP address to mobile device 110. Once the GAN IP address is passed to MS handset 110 by SGW 171, the public IP address assigned to the handset is passed to the UNC.

Figure 1B:
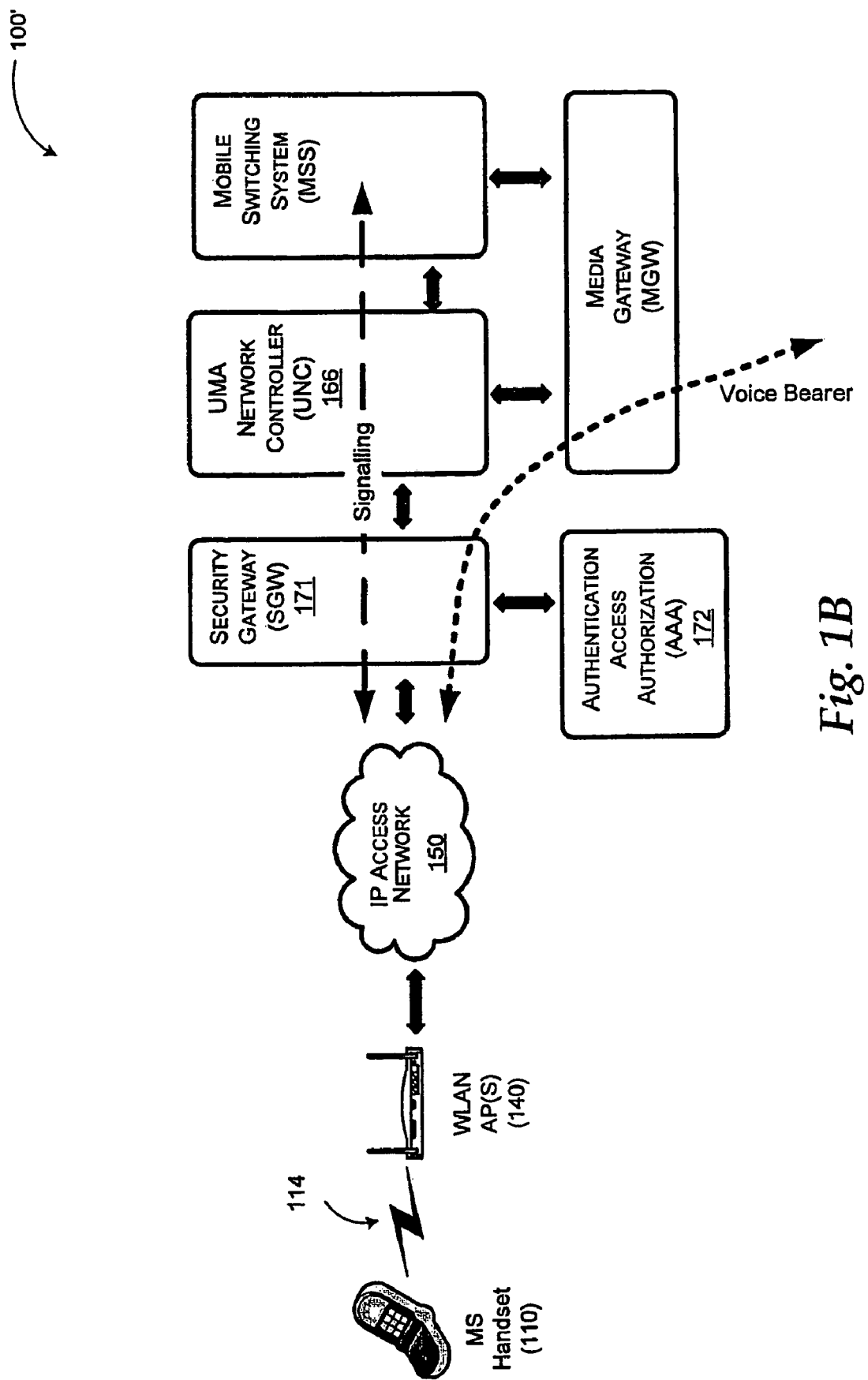

FIG. 1B illustrates another example system 100 that combines a cellular telephone network with a UMA network. The described system 100' is again arranged to accept registration requests and call connections from a mobile device 110 to either a cellular telephone network (not shown), or to a UMA network.

The example UMA network includes one or more access points (AP) 140 that are arranged to accept UMA communications 114 from mobile device 110. Each access point is again coupled to an Internet protocol network 150 through a broadband connection. IP Network 150 is arranged to route UMA communications (data, voice, SMS, etc.) between the APs and a security gateway (SGW) 171. The security gateway 171 controls access to the UMA network controller (UNC)

166, which is arranged to communicate with a UMA database (not shown) for logging and accessing various data associated with UMA communications. Authentication, access, and authorization is handled by SGW 171 via AAA module 172, as previously described.

For the example system 100', the signaling path is routed through UNC 166 to a mobile switching system (MSS), while the voice bearer path is routed through UNC 166 to a media gateway (MGW). The signaling portion of a UMA call governs various overhead aspects of the UMA call such as, for example, when the call starts, when the call stops, initiating a telephone ring, etc. The voice bearer portion of the UMA call contains the actual content of the UMA call itself (which can contain either data or voice information). The MGW controls the content flow between the service provider and mobile device 110, while the MSS controls the signaling flow (or control overhead related flow) between the service provider and mobile device 110.

Figure 2:
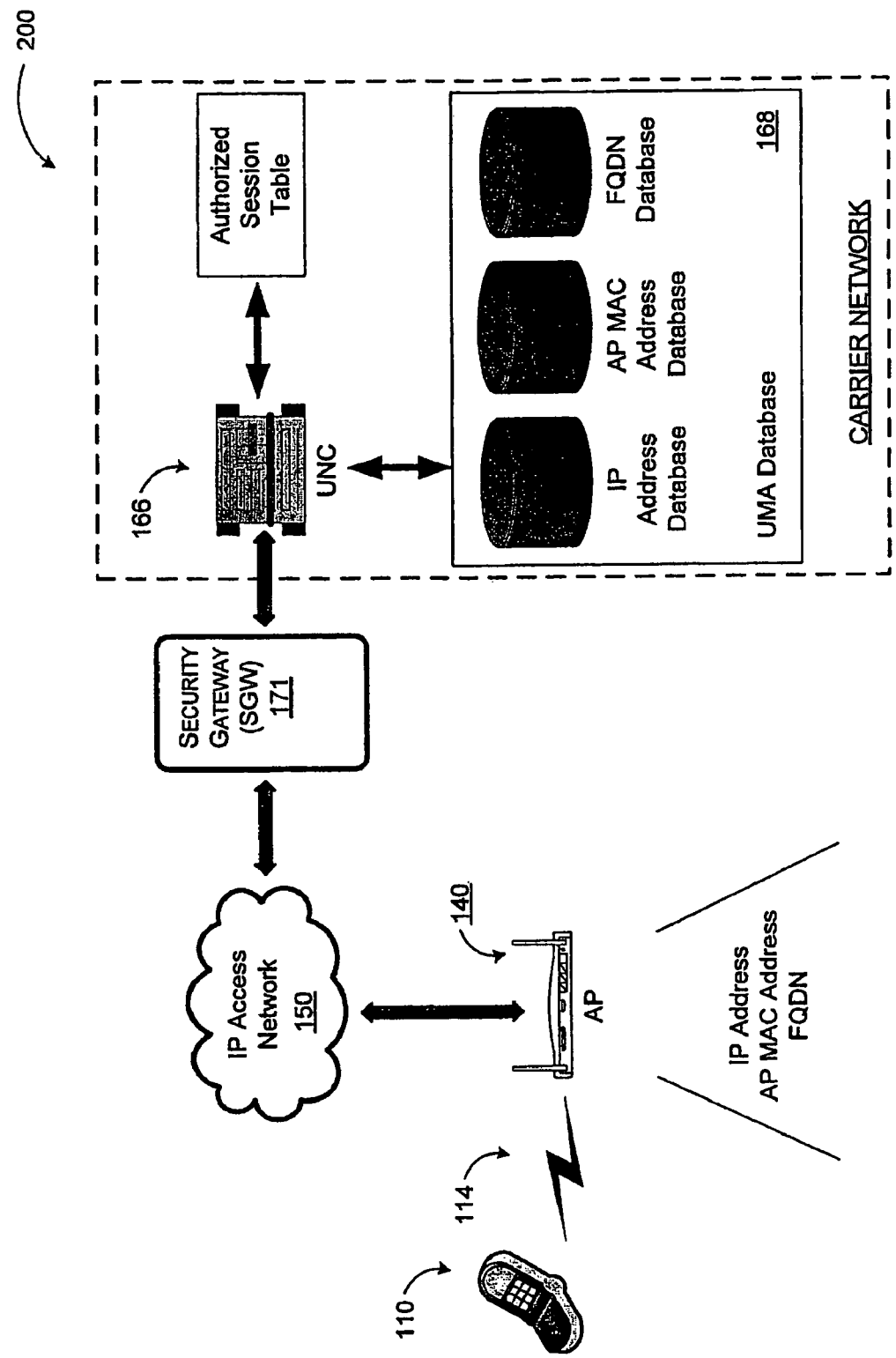
FIG. 2 illustrates a UNC configured in a UMA network to authorize and reject access based on access point (AP) identifiers.

FIG. 2 is an illustration of a UNC configured in a UMA network for managing network authorization. A mobile device 110 is arranged to initiate a connection request with a UMA network via a wireless connection 114 to a local area network (LAN) access point (AP) 140. LAN AP 140 is arranged to communicate with a UMA network controller (UNC) 166 via an IP access network 150, and a security gateway (SGW) 171. UNC 166 is arranged to monitor connection requests associated with each MS, process each connection request, and either permit or reject access to the UMA network based on at least one identifiers associated with the MS. Authorized accesses to the UMA network can be maintained by UNC 166 with an authorized session table, or similar data construct. UNC 166 is arranged in communication with a database (UMA dB) 168 to determine if the MS is authorized for access to the UMA network. Example connection information may include a media access control (MAC) address associated with an access point, an International Mobile Subscriber Identifier (IMSI) associated with mobile subscriber handset, and an Internet protocol (IP) address (or "Public IP address") associated with the access point, a fully qualified domain name (FQDN), to name a few. UMA dB 168 may be a combination of databases such as one for IP addresses, one of MAC addresses, and one for FQDN, or a single database that includes all such identifiers. The databases may be arranged to include "blocked" identifiers such as may be referred to as "blacklisted", as well as "authorized" identifiers that may be referred to as "whitelisted."

Some Considerations for the System

Many user experiences have been considered in the system to provide an easy out of the box experience capable of satisfying the needs of a variety of users and a variety of usages of such devices. Some of these experiences include:

1. The initial powering up of a new mobile device may not be performed by the eventual user of the device. The system considers who is performing the initial powering up of the device.

2. The interests of users may vary. Some users may purchase the mobile device because of the alternate wireless connectivity option, while others may not even know that the device provides such an option. Therefore, the system considers the ability to cater to users having a wide range of interest in the UMA mode.

3. The temporal interests of users during an initial powering up of a new mobile device may also vary. Some users may wish to go directly into the UMA setup, while others may want to do so at a later time. The system considers the needs of a user during the initial powering up of the device.

4. The user's location during the initial powering up of a mobile device may vary from where the user may frequently use the mobile device. In some cases, the user may be in a location where the user will frequently visit and make wireless type calls. In other cases, the user may be in a location where the user will rarely or never make wireless type calls. The system considers the location of a user during the initial powering up of the device.

5. Although the user's location during an initial powering up of a mobile device may be a location the user will frequent for wireless type connections, there may be others locations the user will utilize as well. The system considers a user's need to utilize a device's wireless mode in a number of different locations.

6. The user may be unable to access a wireless network during the initial powering up of a mobile device. The system considers the availability of a wireless network during the initial powering up of the device.

7. The user may be distracted during the initial powering up of a mobile device. The system considers a user's attention to the device.

8. The user may initially have little or no interest in wireless options provided by the mobile device, but may later reconsider. The system considers a user's changing interests in the wireless options of the device.

9. Terms and phrases related to wireless options may be unfamiliar to a user of a device. Some of these terms may include "available networks," "saved networks," "quick connect," or "secure WiFi." The system considers a user's possible lack of familiarity with terms and phrases related to the wireless mode.

10. Users may want an easy and quick initial wireless experience. Additionally, users may want a successful initial connection and use of a wireless connection. The system considers the user's first wireless experience with respect to the initial set up and use of the mobile device's wireless options.

11. Access points for a service provider generally need to have different service set identifiers (SSIDs) or network names. The system considers accessing a number of access points, including access points created after the user purchases the mobile device, each of the access points having a different SSID.

12. Users may not purchase a service provider's access point, and only a dual mode mobile device. The system considers a user having a mobile device without a corresponding access point.

Process Flow Example

Figure 3:
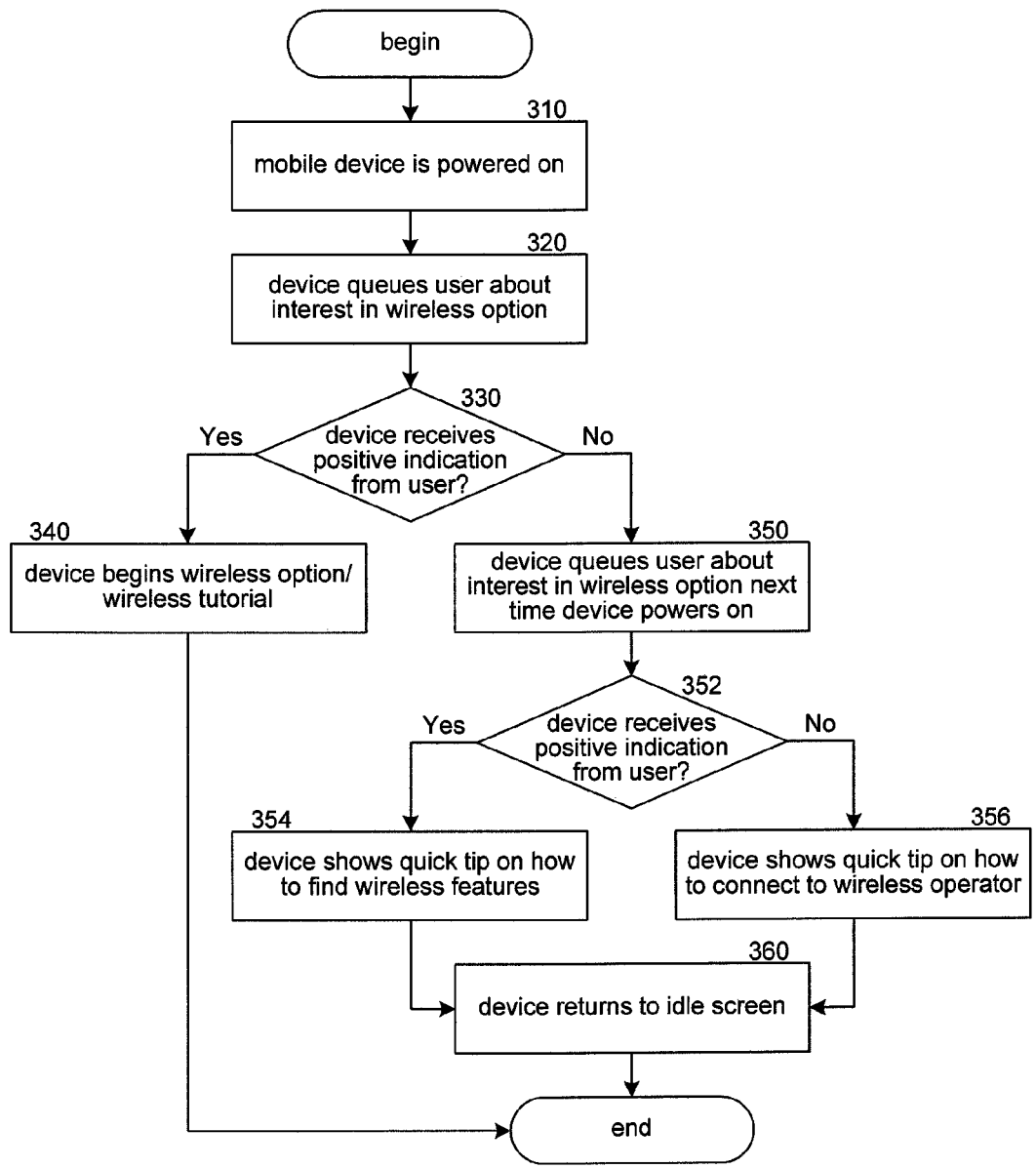
FIG. 3 is an example of a process flow for determining a user's interests of an alternate wireless mode of a mobile device during the initial powering up of the device.
Figure 7A:
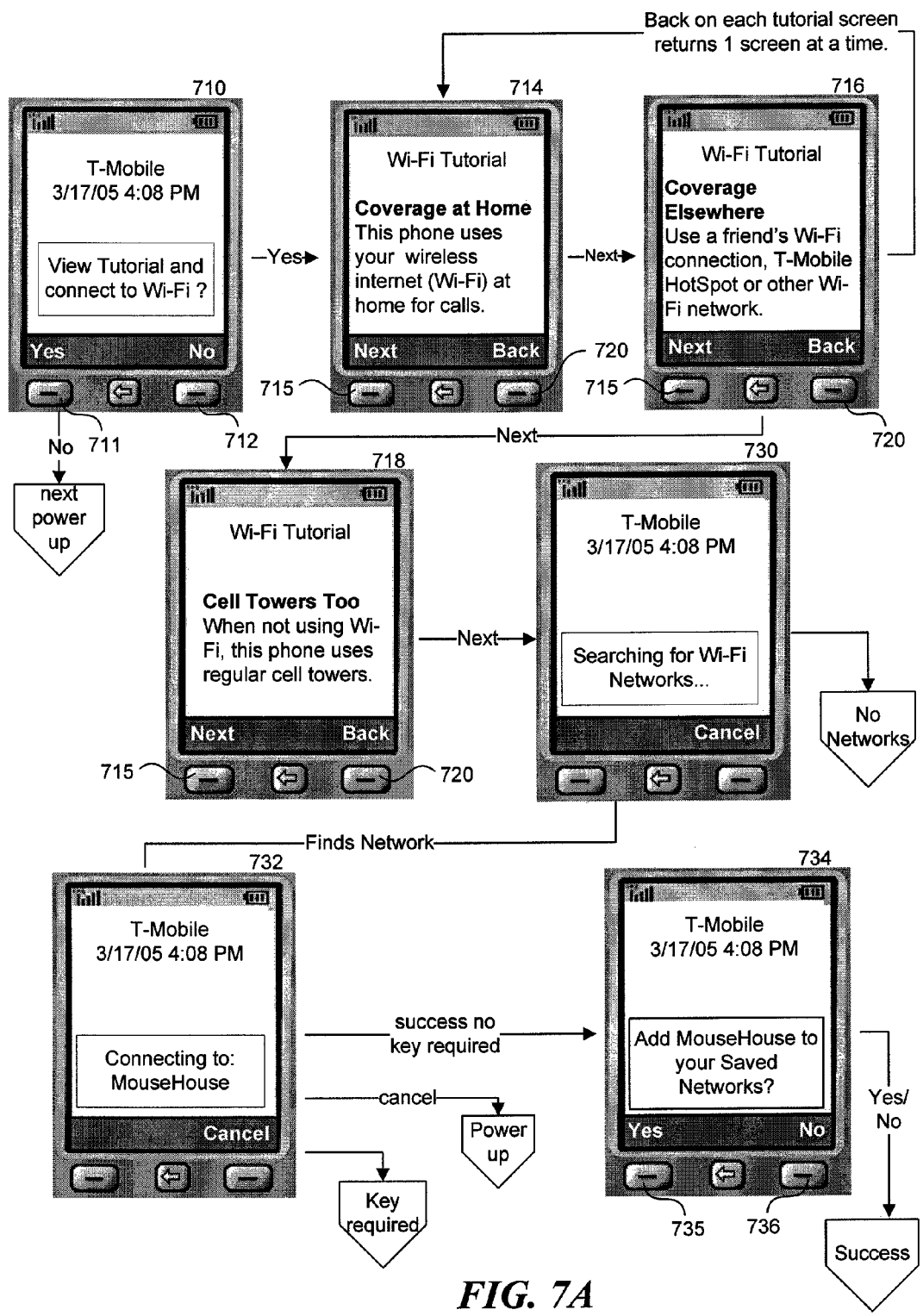
FIG. 7A-7C are examples of screens displayed by a user interface subsystem of the mobile device.
Figure 7B:
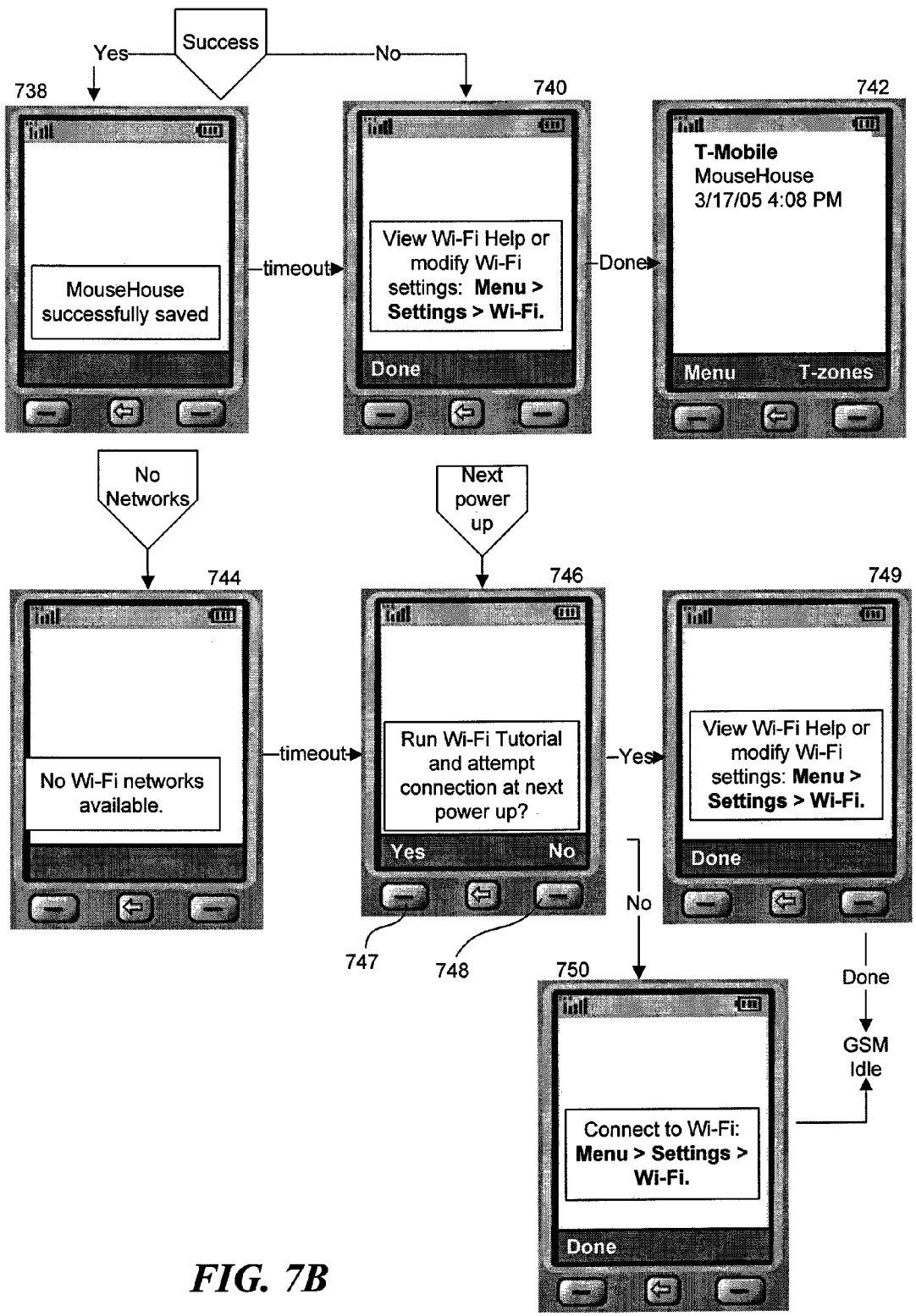
Figure 7C:
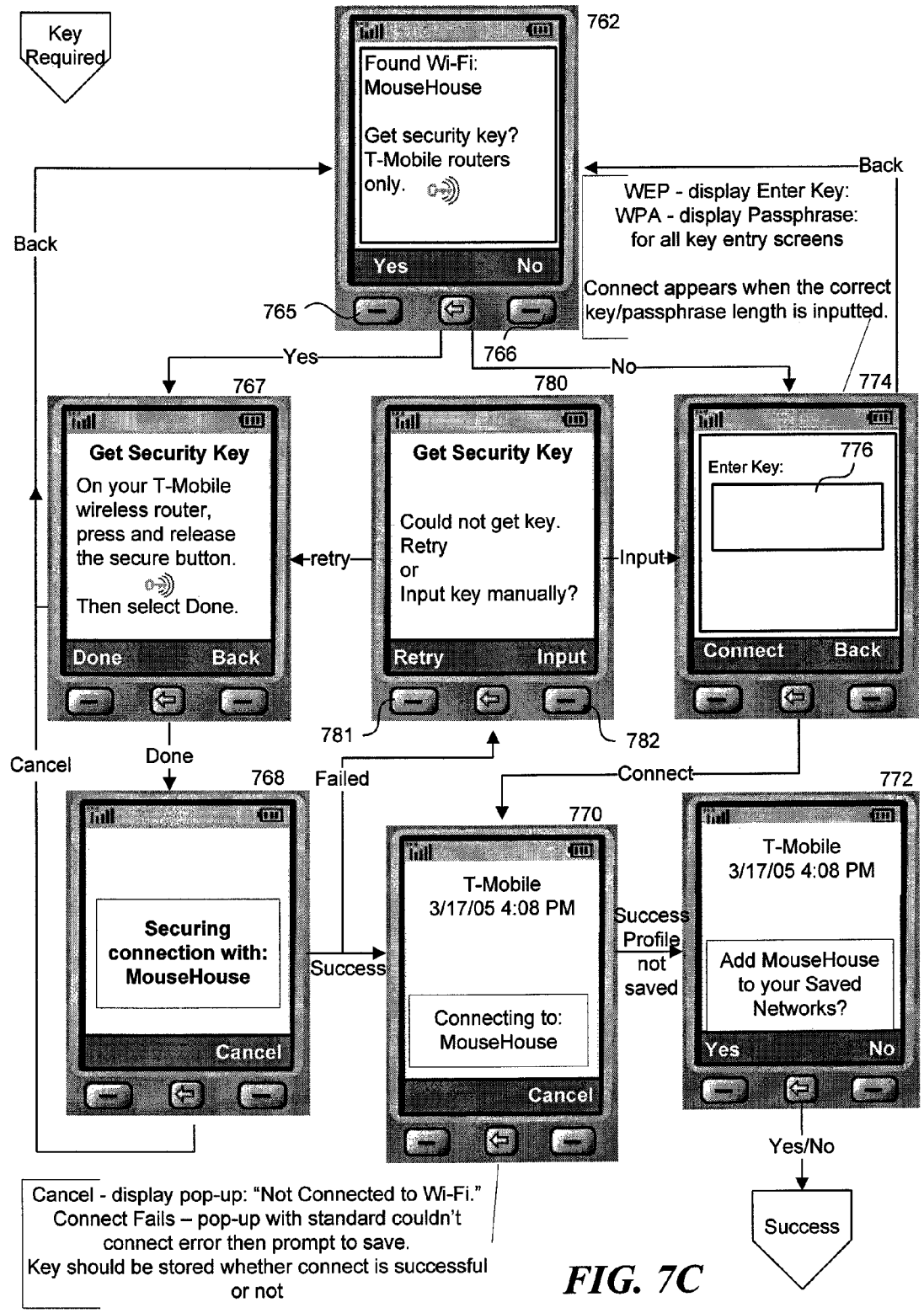
Figure 8A:
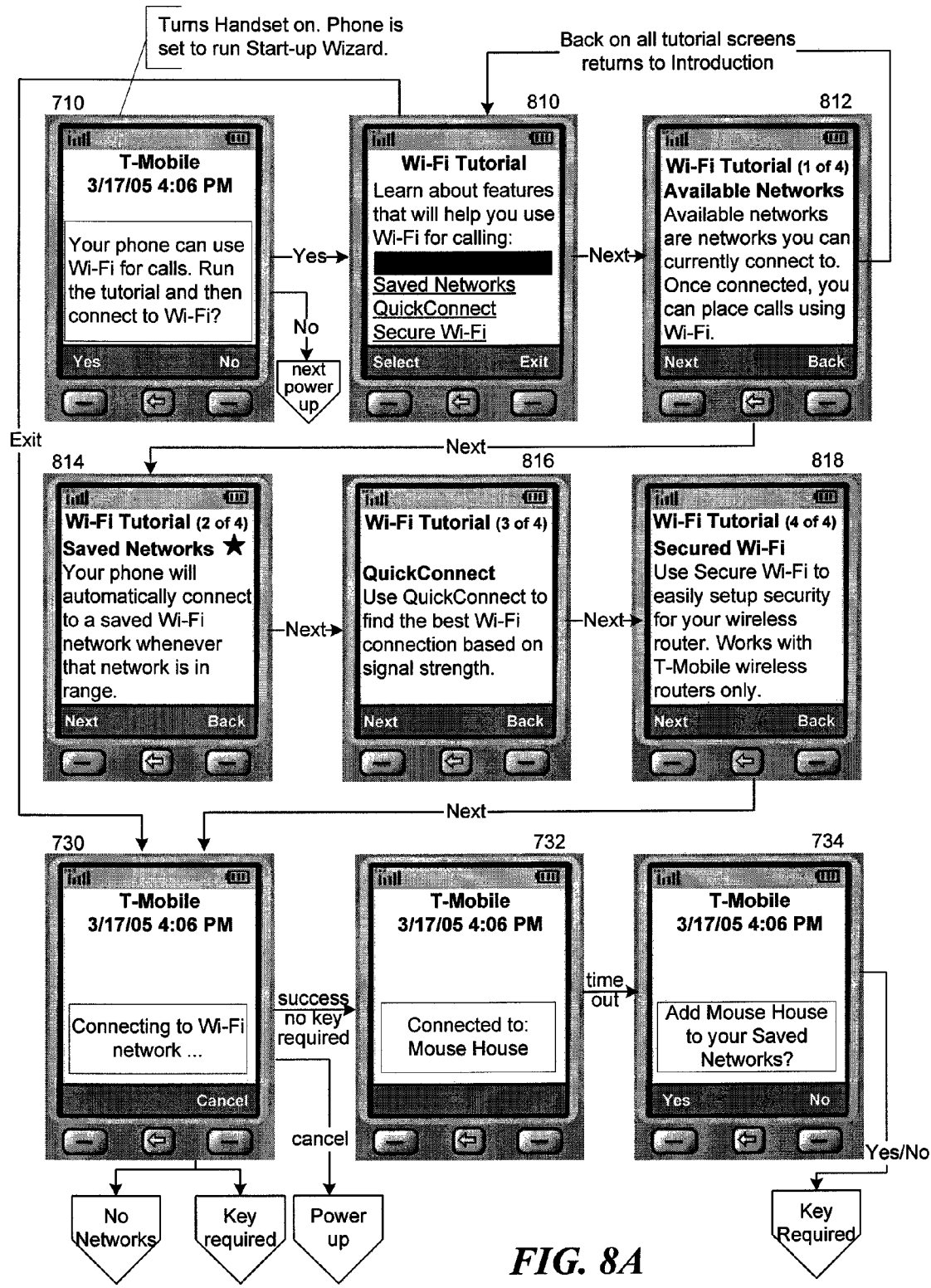
FIGS. 8A-8C are examples of display screens according to an alternative embodiment of routines 300 and 400.
Figure 8B:
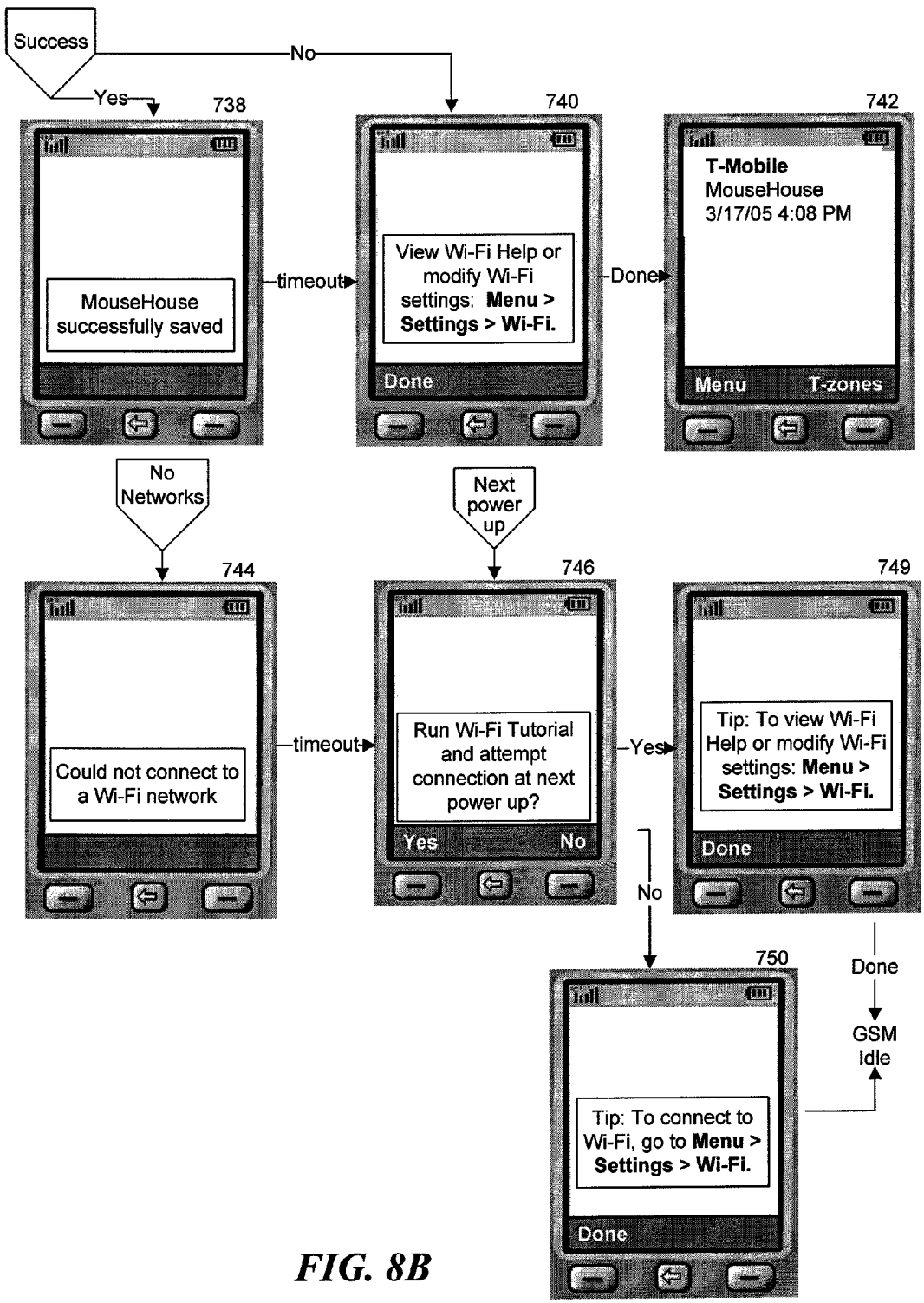
Figure 8C:
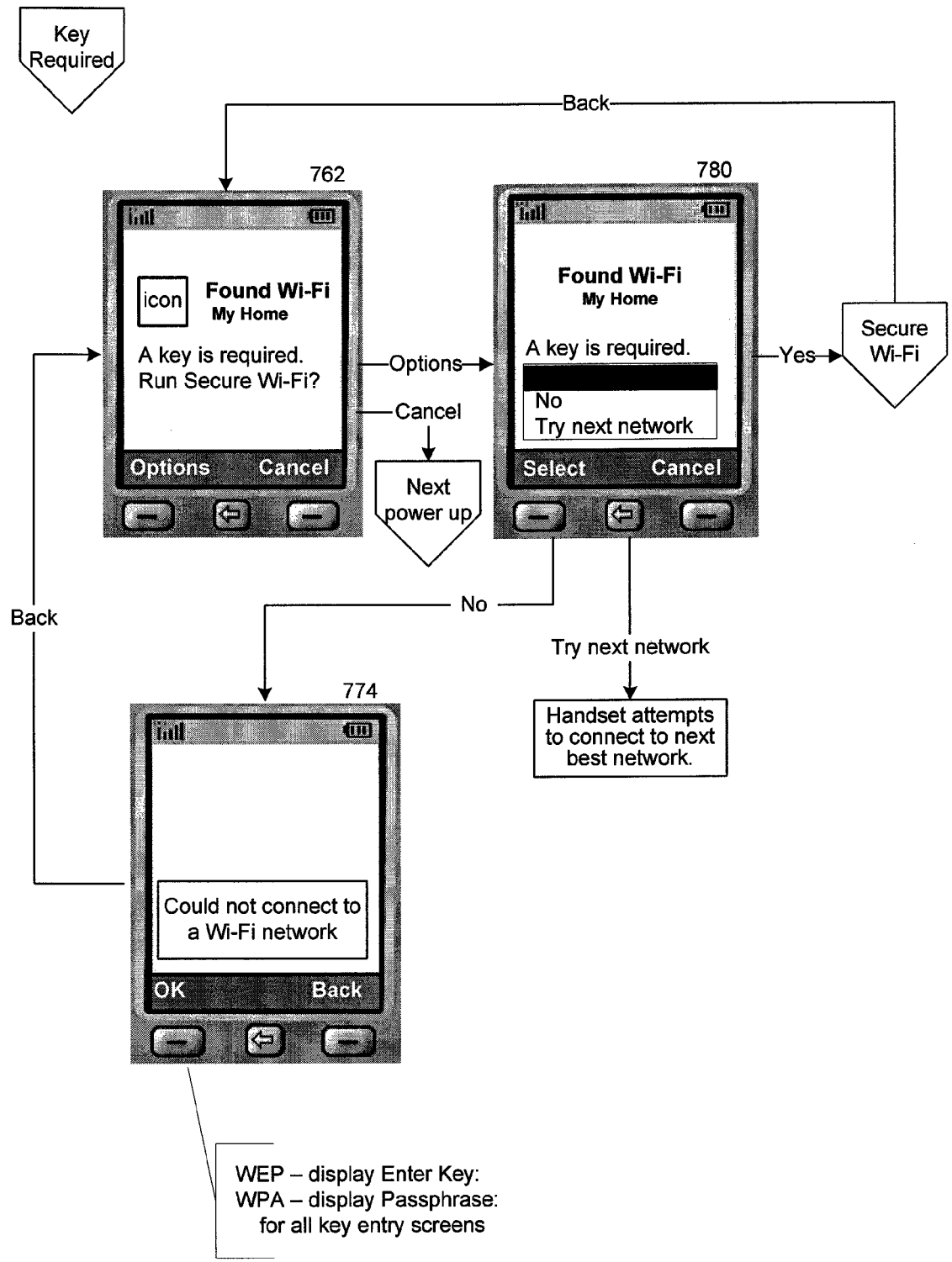

Referring to FIG. 3, one example of a process for determining a user's interest in a mobile device's alternate wireless mode during the initial powering up of the device is shown as routine 300. Additionally, FIGS. 7A-7C illustrate examples of display screens used by the system in performing routine 300 (and other routines discussed herein), and will be incorporated in the current discussion of FIG. 3 and subsequent Figures. FIGS. 8A-8C illustrates additional examples of display screens used by the system. They will not be discussed with the following routines as these additional examples are self-explanatory based on the detailed description provided herein and the Figures themselves.

In block 310, the mobile device is powered on. In block 320, the device asks the user about his/her interest in the alternate wireless mode of the device (screen 710 of FIG. 7A). In this example, the device queries the user via a display screen of the device; however, other ways are possible. In decision block 330, if the device receives a positive indication from the user (e.g., the user presses a "yes" button 711), the routine proceeds to block 340, else the routine proceeds to block 350. Upon receiving the positive indication, the device, in block 340, proceeds to WiFi mode. Further details regarding alternate wireless mode will be discussed with respect to FIG. 4.

Upon receiving a negative indication (e.g., the user presses a "no" button 712), the device, in step 350, asks the user if he/she would be interested in the alternate wireless mode the next time the device powers up (screen 746 of FIG. 7B). In decision block 352, if the device receives a positive indication from the user (e.g., the user presses the "yes" button 747) the routine proceeds to block 354, else the routine proceeds to block 356. In block 354, upon receiving a positive indication from the user, the device displays a tip to the user related to users who have shown interest in the alternate wireless mode (screen 749). An example of the tip may be an indication of where the user can find information regarding specific wireless features of the device. Upon receiving a negative indication from the user (e.g., the user presses the "no" button 748), the device, in block 356, displays a tip to the user geared towards users who have shown no interest in the alternate wireless mode (screen 750). For example, the device may show the user how to initiate an alternate wireless mode setup should the user change their mind about using the device's wireless functionality. After displaying either tip screen in blocks 354 or 365, the device, in block 360, returns to idle and functions in GSM mode.

Figure 4:
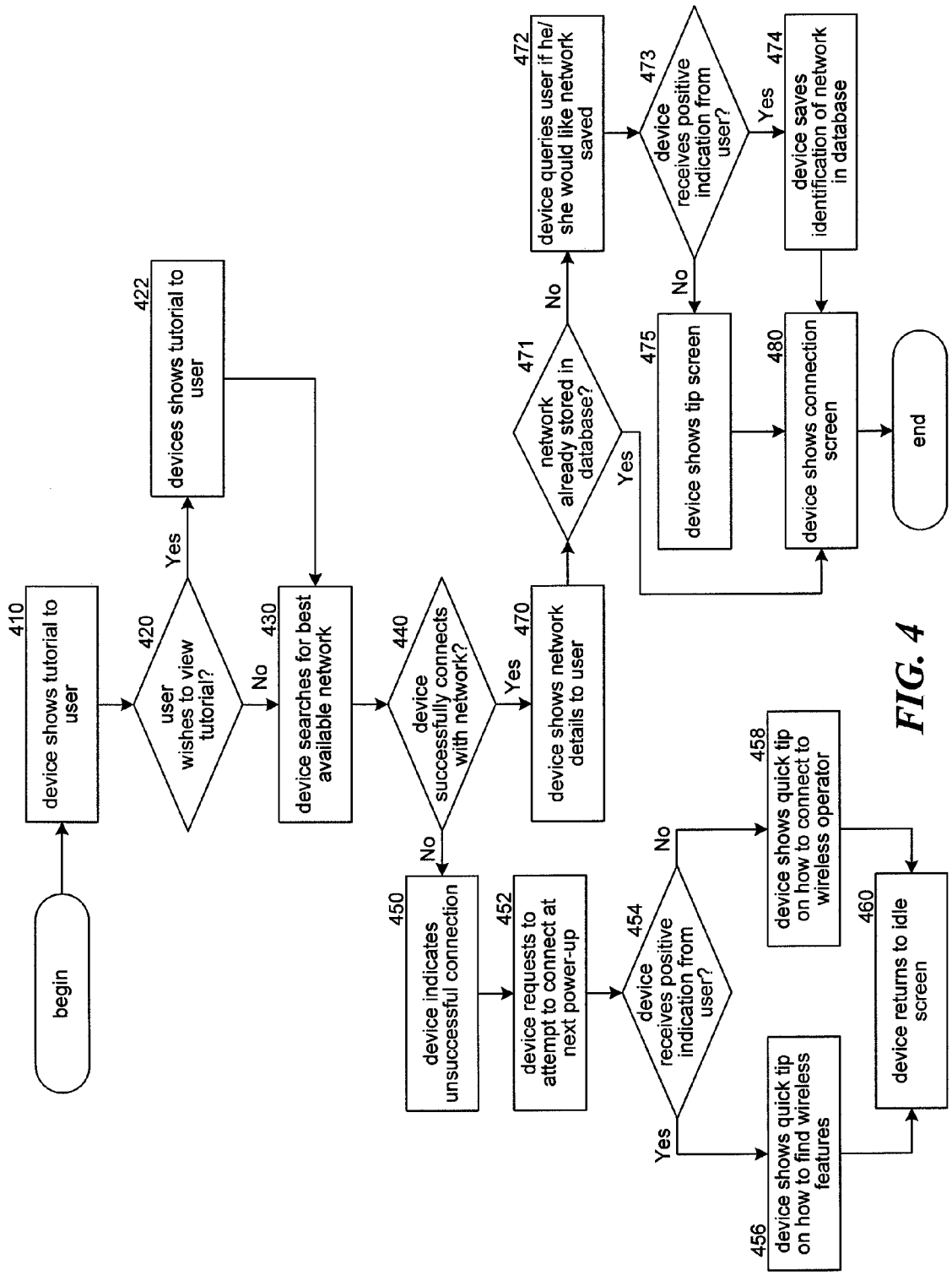
FIG. 4 is an example of a process flow for connecting an interested user to an alternate wireless network.

Referring to FIG. 4, a process for connecting an interested user to a alternate wireless network is shown as routine 400. In block 410, the device displays a wireless tutorial to the user (screen 714 of FIG. 7A). In decision block 420, if the device receives an indication that the user wishes to view the tutorial further (e.g., the user presses the "next" button 715) the routine proceeds to block 422, else the routine proceeds to block 430. Upon receiving a request for the tutorial, the device, in block 422, displays one or more screens describing features of the device's alternate wireless mode (screens 716 and 718). The system enables the user to view some, or all, of the tutorial (the user may wish to exit and press a "back" button 720 at any time, or may continue through each page by pressing the "next" button 715). For example, these displays may describe connection options (such as connecting at home, connecting outside of the home, or connecting with other modes). One skilled in the art will appreciate that the system may present the tutorial to the user in a number of ways. For example, the tutorial may be an audio tutorial where the user is able to navigate through the tutorial via a series of voice prompts.

Once the user finishes with the tutorial or the user does not choose to view the tutorial (e.g., the user presses the "back" button 720), the routine proceeds to block 430, and the device searches for the best available alternate wireless network to make a connection (screen 730). Further details regarding the search for and determination of a best available network are discussed with respect to FIG. 6.

In decision block 440, if the device is successful in connecting to an available alternate wireless network, the routine proceeds to block 470, else the routine proceeds to block 450. In some cases, the available alternate wireless network will be a secure network. In these cases, the system may require the user to provide security credentials, such as a key that authorizes a user to the network. Further details regarding connection to a secure network are discussed with respect to FIGS. 5 and 7C.

Upon a successful connection to an alternate wireless network, the device, at block 470, displays information related to the network connection, such as the network's name or SSID (screen 732). In decision block 471, if the connected network is in the device's database of networks, the routine proceeds to block 480, else the routine proceeds to block 472. If the network is in the database, the device, in block 480, shows the user a connection screen (screen 742 of FIG. 7B) and operates in alternate wireless network mode. If the network is not in the device's database, the device, at block 472, asks the user if he/she would like the connected network added to the device's database (screen 734). In decision block 473, if the device receives a positive indication (e.g., the user presses the "yes" button 735) from the user to add the connected network to the device's network, the routine proceeds to block 474, else the routine proceeds to block 475. In block 474, the system saves the connected network in the device's database of alternate wireless networks and displays a confirmation to the user (screen 738). The routine then proceeds to block 480 and the device operates in alternate wireless network mode over the connected network (screen 742). When the user does not want to add the connected network (e.g., the user presses the "no" button 736), the device, in block 475, displays a tip to the user (screen 740), such as a tip on how to add a network to the database. The routine then proceeds to block 480 and the device moves to the alternate wireless network mode over the connected network (screen 742).

In decision block 440, the routine proceeds to block 450 when the device cannot connect to an alternate wireless network. In block 450, the device displays an indication of an unsuccessful connection to the user (screen 744 of FIG. 7B). In block 452, the device then asks the user if he/she wishes to attempt connection to an alternate wireless network when the mobile device next powers on (screen 746). In decision block 454, if the device receives a positive indication from the user (e.g., the user presses the "yes" button 747), the routine proceeds to block 456, else (e.g., the user presses the "no" button 748) the routine proceeds to block 458. In block 456, the device displays a tip screen (screen 749) aimed at users who will attempt to connect at the next time. In block 458, the device displays a tip screen (screen 750) geared towards users who do not wish to attempt another connection. After either block 456 or 458, the routine proceeds to block 460 and the device moves to GSM mode (not shown).

Figure 5:
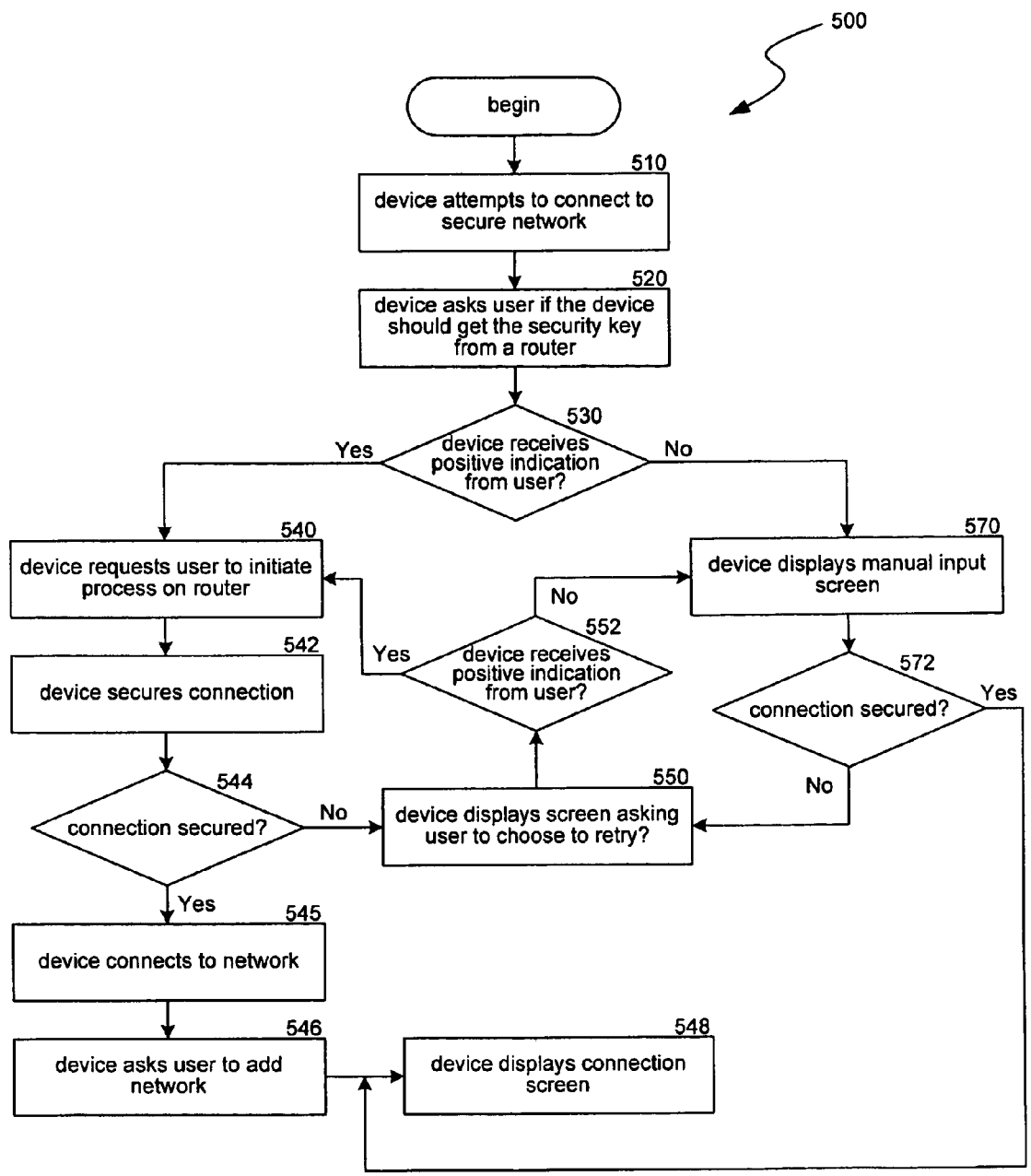
FIG. 5 is an example of a process flow for connecting a mobile device to an alternate secure wireless network.

Referring to FIG. 5, a process for connecting a mobile device to a secure alternate wireless network is shown as routine 500. Similar to block 430 of FIG. 4, the device, at block 510, attempts to connect to an available secure network. At block 520, the device displays details about the network and asks the user if he/she would like the device to obtain the security key (screen 762 of FIG. 7C). At decision block 530, if the device receives a positive indication from the user (e.g., the user selects "yes" 765), the routine proceeds to block 540, else the routine proceeds to block 570.

At block 540, the device requests the user to initiate a process on a corresponding router to obtain the security credentials (screen 767). For example, certain predetermined routers, or routers specifically configured, can automatically provide credentials wirelessly to the device (such as "T-Mobile routers"). In this example, the user must press and release a specific button on the wireless router or access point to initiate a secure connection with the mobile device to permit secure transfer of the security credentials. Once the user initiates this process, the device, at block 542, attempts to secure the connection (screen 768). At decision block 544, if the connection is secured, the routine proceeds to block 545, else the routine proceeds to block 550. In block 545, the device connects to the network (screen 770). If the network profile is not saved in the device's database, the device, in block 546, asks the user if he or she would like to add the newly connected network to the database (screen 772). Regardless of whether the network is added, the routine proceeds to block 548 and displays a connection screen (screen 742 of FIG. 7B).

At decision block 544, if the connection is not secured or could not be established, the routine proceeds to block 550. In block 550, the device asks the user if he or she would like the device to retry obtaining the security key (screen 781). In decision block 552, if the device receives a positive indication from the user (e.g., the user presses the "retry" button 781) the routine proceeds back to block 540, else the routine proceeds to block 570.

At decision block 530, the routine proceeds to block 570 when the user does not provide a positive indication (that is, the user presses the "no" button 766 indicating that the user wishes to manually enter the security credentials), or when the user does not wish to retry a connection as discussed in decision block 552 (that is, the user presses an "input" button 782). In block 570, the device displays a manual input screen to the user (screen 774). The screen may be able to receive identification credentials from the user (user input component 776), such as a password. In decision block 572, if the device receives valid credentials from the user, the routine proceeds to block 546, else the routine may proceed to block 550 or request the user re-enter the security credentials. In block 548, the device connects to the secure network as discussed above.

Figure 6:
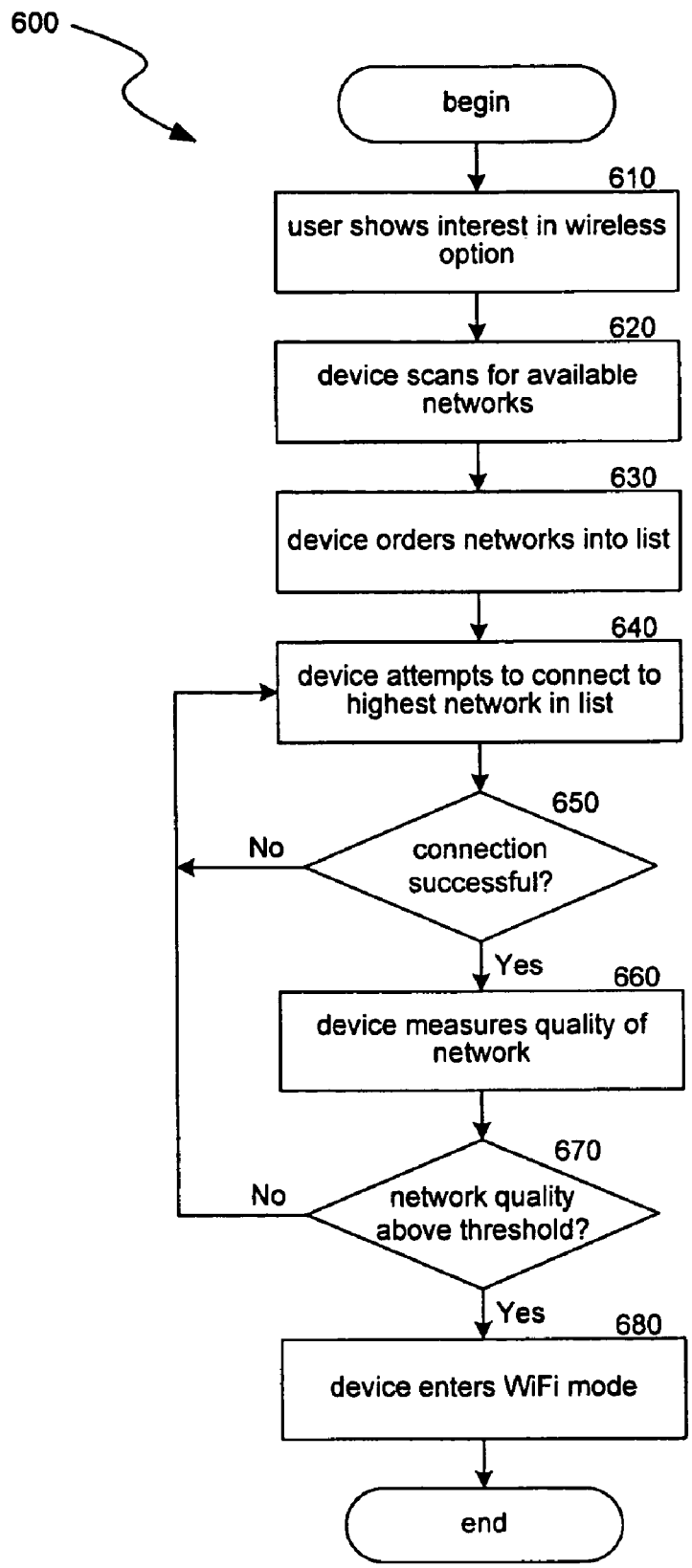
FIG. 6 is an example of a process flow for connecting a mobile device to the best available alternate network.

Referring to FIG. 6, a process of connecting a mobile device 110 to a best available alternate network is shown as a routine 600. Beginning in block 610, the mobile device receives a connection request from a user. For example, the user may select "yes" button 711 of FIG. 7A or finish a tutorial).

In block 620, the mobile device 110 scans for available networks. For example, the device scans WiFi or other frequencies for certain networks, including but not limited to predetermined networks, networks in an "open" state (that is, available for connection by the device), or those that are included in a managed network database stored within the mobile device. As described below, the mobile device may search for certain predetermined networks that have a specific address or ID.

Upon detection of one or more networks (e.g., networks available to the user), in block 630, the device creates a list of available or potentially available networks. This list may be ordered by signal strength. The mobile device may determine the signal strengths of available alternate networks in a number of ways, such as with a received signal strength indicator (RSSI). In some cases, the device may first list any networks stored within the managed network database, regardless of signal strength, and then list additional available networks found during the scan.

In block 640, the mobile device 110 attempts to connect to the network highest in the list (for example, the network providing the greatest signal strength to the device). At decision block 650, if the connection is successful, the routine continues to block 660, else the routine proceeds back to block 640 and the device attempts connection with the next highest network on the list. Upon successful connection to a network, at block 660, the device measures the quality of the network. At decision block 670, if the system determines the quality of the network to be above a pre-determined threshold, the routine continues to block 680, else the routine proceeds back to block 640 and the device attempts connection with the next highest network on the list. The system may determine the quality of the network in a number of ways. For example, if the network is not a UMA compatible network (or if a UMA connection/call cannot be fully established), then the network will be considered to be below the pre-determined threshold. Additionally, the system may measure URR Uplink quality indicators or other parameters (such as bit or frame error rate) that indicate a network's quality. A main application for a UMA connection is for a voice call, and voice is very sensitive to sudden changes in connection speed, jitter, etc. Thus, by determining a quality of the connection, a mobile device can help ensure a good experience for the user.

In block 680, the mobile device 110 enters an alternate wireless network mode (screen 742 of FIG. 7B) that enables the device to access UMA services via the current network connection. Should the device be unsuccessful in connecting to any of the available networks (or, optionally, unsuccessful in observing an adequate network quality in any connected networks), the mobile device may indicate the lack of success and revert to an idle mode or to the mode previous to the connect invocation of block 610 (e.g., continue communications with the cellular network over a cellular base station).

If the device is preprogrammed to match to any networks containing a specific identification, such as networks with a "TMOHSxxxx" address or identification, (where the x may be any hexagonal character), the device may be able to search for, find, and quickly connect to such a network without the need for additional input from a user. These networks may be associated with predetermined routers or access points, such as those described above with respect to blocks 762 and 767 of FIG. 7C. The open ended network configuration allows the system to connect to a best available network out of many available networks. For example, the mobile device can access a network identified as "TMOHS2344" or "TMOHS7865" or any network that starts with "TMOHS." The "wildcard" matching allows the system to further enhance a user's out of box experience by providing the user of a new mobile device with a pre-established wireless connection to many possible networks.

Referring to FIGS. 8A-8C, examples of display screens according to an alternative embodiment of routines 300 and 400 are shown. In general, alternatives and alternative embodiments described herein are substantially similar to previously described embodiments, and common elements and functions are identified by the same reference numbers. Only significant differences in construction or operation are described in detail. In these examples, the tutorial described with respect to blocks 410 and 420 contains additional or alternative screens, such as screens 810, 812, 814, 816, and/or 818. The screens 810, 812, 814, 816, and/or 818 show an index-based tutorial, wherein the systems enables a user to navigate the tutorial in order to best meet the needs of the user. For example, screen 816 shows a "QuickConnect" feature that may be unknown port unfamiliar to a user. QuickConnect enables the mobile device to quickly search for and connect to an available wireless network having a high quality. Further details regarding QuickConnect may be found in commonly assigned U.S. patent application Ser. No. 11/480,775, entitled "SYSTEM AND METHOD FOR CONNECTING TO A VOICE NETWORK, SUCH AS WIRELESSLY CONNECTING TO A UMA NETWORK," which is incorporated by reference in its entirety.

Further details regarding this alternative embodiment are self-explanatory based on the detailed description provided herein and FIGS. 8A-8C themselves.

Suitable Computing Environment

FIGS. 1A, 1B and 2 and the discussion herein provide a brief, general description of a suitable computing environment in which the system can be implemented. Although not required, aspects of the system are described in the general context of computer-executable instructions, such as routines executed by a general-purpose computer, e.g., a server computer, wireless device or personal computer. Those skilled in the relevant art will appreciate that the system can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "mobile device," "computer," and the like are generally used interchangeably herein, and refer to any of the above devices and systems, as well as any data processor.

Aspects of the system can be embodied in a special purpose computer or data processor that is specifically programmed, configured, or constructed to perform one or more of the computer-executable instructions explained in detail herein. Aspects of the system can also be practiced in distributed computing environments where tasks or modules are performed by remote processing devices, which are linked through a communications network. In a distributed computing environment, program modules may be located in both local and remote memory storage devices.

Aspects of the system may be stored or distributed on tangible computer-readable media, including magnetically or optically readable computer discs, hard-wired or preprogrammed chips (e.g., EEPROM semiconductor chips), nanotechnology memory, or other data storage media. Alternatively, computer implemented instructions, data structures, screen displays, and other data under aspects of the invention may be distributed over any network, on a propagated signal on a propagation medium (e.g., an electromagnetic wave(s), a sound wave, etc.) over a period of time, or they may be provided on any analog or digital network (packet switched, circuit switched, or other scheme).

Example Mobile Device

Figure 9:
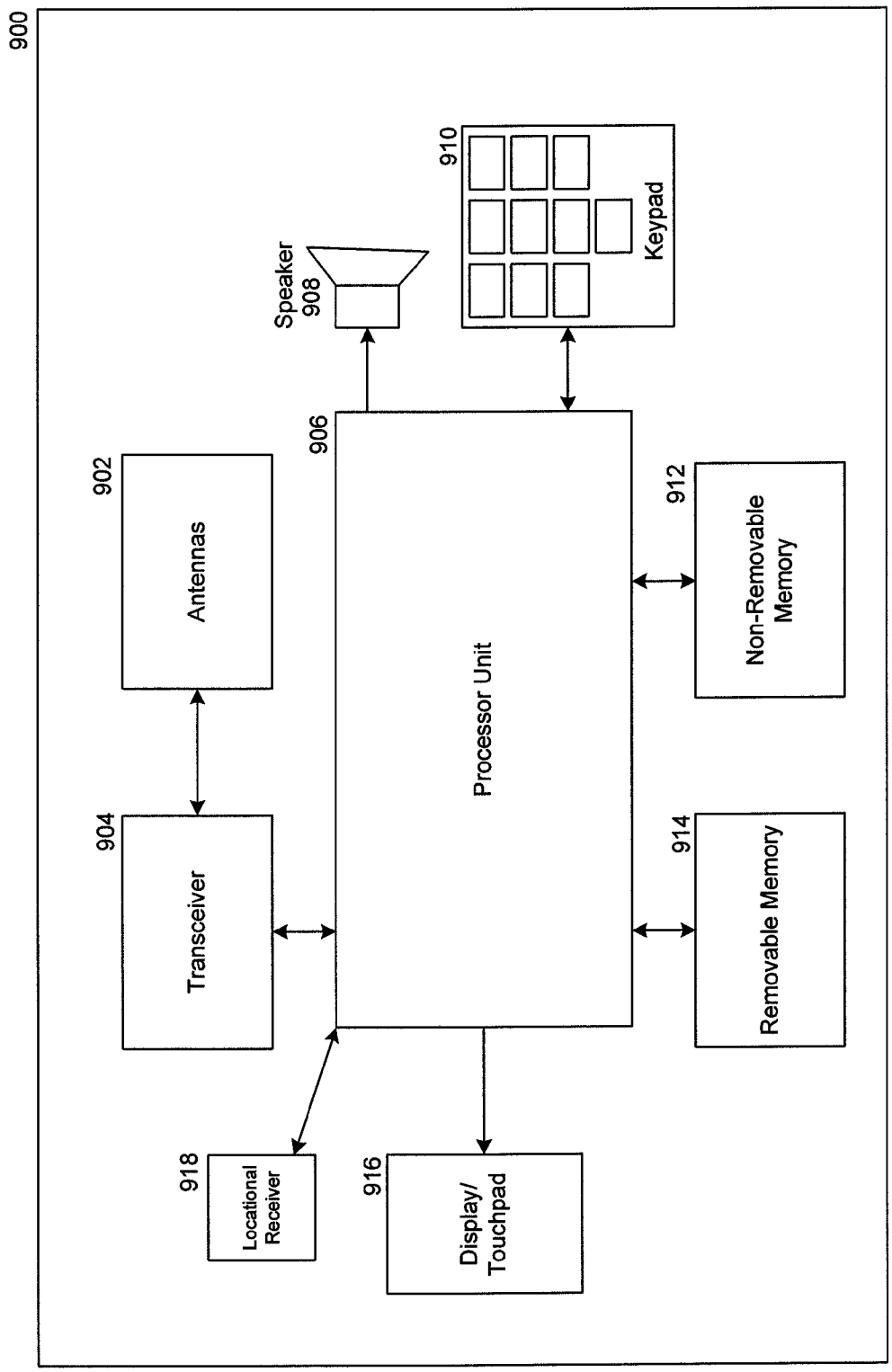
FIG. 9 is a block diagram illustrating an example of a mobile device for use under some embodiments of the technology.

FIG. 9 shows a block diagram of a typical mobile communication device 900 such as a mobile device 110. The mobile device 800 has one or more internal or external antennas 902 for receiving and transmitting electromagnetic signals such as radio frequency signals. A transceiver 904 is connected to antenna 902 and typically provides modulation and demodulation of the transmitted and received signals, respectively. A processor unit 906 connected to the transceiver 904 may comprise a signal processor, microprocessor, ASIC, or other control and processing logic circuitry. A processor unit 906 may perform signal coding, data processing, input/output processing, power control, and other functions necessary for implementing a mobile communication device. The processor unit 906 may include one or more of the components noted above, as well as audio processing components for processing audio signals, including amplification, coding, filtering, and so forth. A user might provide input to the processor unit 906 via a keypad 910, speaker/microphone 908, or display/touchpad 916. In turn, the processor 906 might provide information to the user via the display/touchpad 916 or speaker/microphone 908. Additionally, the processor 906 may access information from, and store information in, a non-removable memory 912 or a removable memory 914. Non-removable memory 912 may consist of RAM, ROM, a hard disk, or other well-known memory storage technologies. Removable memory 914 may consist of Subscriber Identity Module (SIM) cards that are well known in GSM communication systems or other well-known memory storage technologies. Information related to the system, such as information 922 or 924 describing tutorial pages or other user displays may be stored in either memory 912 or 914. The mobile communication device 900 may also include an optional GPS or other locational chipset or receiver 918 that provides latitude and longitude information about the mobile device's 900 current location.

Figure 10:
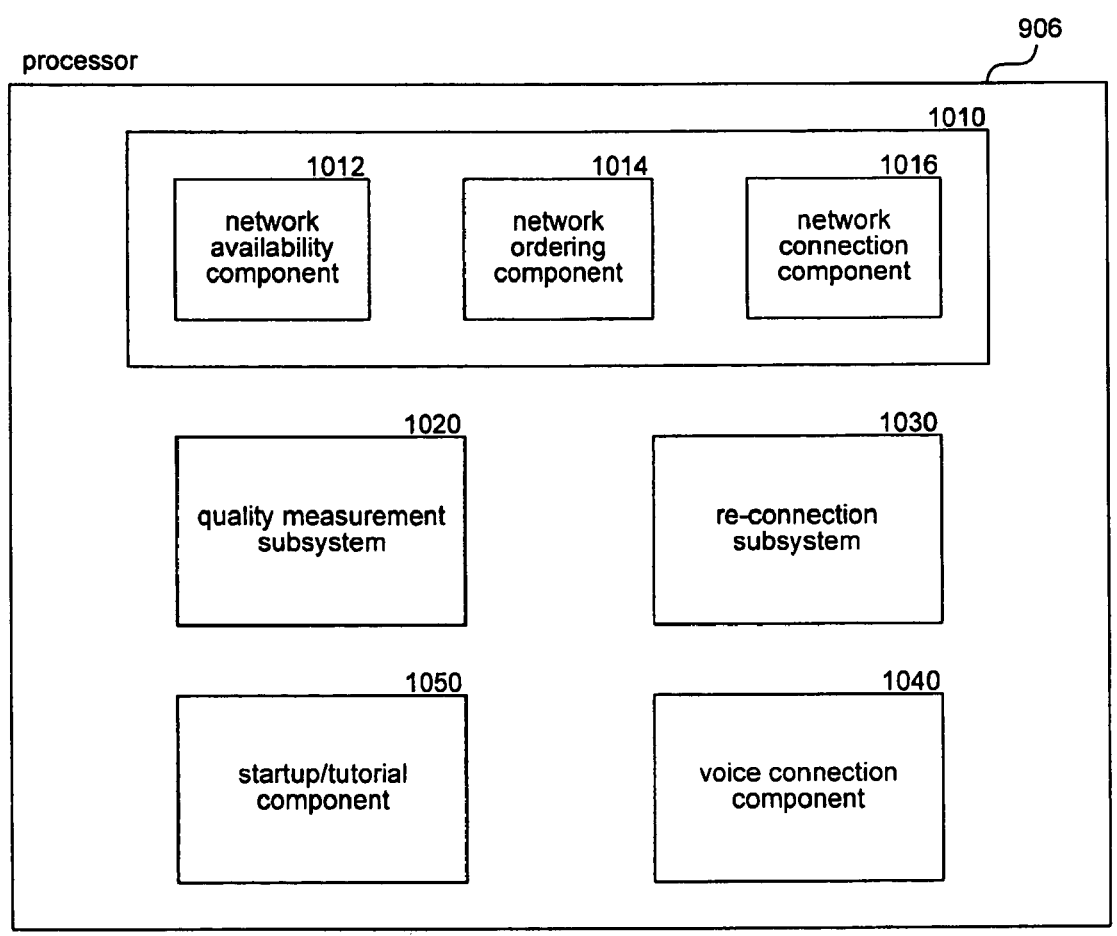
FIG. 10 is a block diagram illustrating components of the processor of FIG. 9 under some embodiments of the technology.

FIG. 10 shows a block diagram of components within processor 906 of mobile device 900. In some embodiments, processor 906 includes a connection subsystem 1010, which may contain a network availability component 1012 configured to determined networks open to access by mobile device 900, a network ordering component 1014 configured to sort and present open alternate networks to the mobile device for access, and a network connection component 1016 configured to connect the mobile device 900 to an available alternate network. Further, the processor 906 may contain a quality measurement subsystem 1020 capable of measuring the quality of a connected network and a re-connection subsystem 1030 capable of automatically initiating and connecting to previously connected networks. Also, the processor 906 may contain a voice connection component 1040 that facilitates the use of voice over a connected IP wireless network. Additionally, processor 906 may contain an initial powering on component 1050 that starts the routines described above when the device 900 is first powered on.

In some embodiments, the mobile device may attempt to connect with networks other than WiFi networks, such as other short range wireless networks. Other wireless networks include IP-based wireless access networks such as IEEE 802.16 (WiMAX), IEEE 802.20 Mobile Broadband Wireless Access (MBWA), Ultra Wideband (UWB) networks, Bluetooth networks, and other know wireless networks.

Aspects of the technology enable users to quickly and easily connect to wireless networks supported by the WiFi mode of a new mobile device. The system may provide a new mobile device with the ability to match and connect to many different access points soon after an initial powering on of the device. Additionally, the system provides users with tutorials dedicated to informing the user about the device's alternate wireless network mode. Also, the system presents users with "tips" or other guidance in order to help the user access the device's alternate wireless network capabilities at other times.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the methods and system provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the technology can be modified, if necessary, to employ the systems, functions, and concepts of the various references described above to provide yet further embodiments of the technology.

These and other changes can be made to the invention in light of the above Detailed Description. While the above description describes certain embodiments of the technology, and describes the best mode contemplated, no matter how detailed the above appears in text, the invention can be practiced in many ways. Details of the system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the technology are presented below in certain claim forms, the inventors contemplate the various aspects of the technology in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the technology.

We claim:

1. A mobile device capable of communicating with a cellular telephone network over a licensed spectrum, and capable of accessing alternate wireless access networks, the mobile device comprising:
   a user interface subsystem, wherein the mobile device invokes the user interface subsystem upon at least one of: an initial powering on of the device, each powering on of the device, and in response to user input, the user interface subsystem comprising:
      a connection request component, the connection request component configured to receive input from the user, wherein the user interface subsystem infers from the input that the user desires the mobile device to implement an alternate wireless access network mode;
      a tutorial component, the tutorial component providing information related to content of a tutorial and a display of the tutorial to the user, wherein the tutorial describes one or more elements of the alternate wireless access network mode of the mobile device, and wherein the tutorial of the tutorial component is displayed to the user when the user interface system infers that the user desires the mobile device to implement the alternate wireless access network mode;
   a stored network component, the stored network component containing one or more settings that enable the mobile device to attempt to connect to an alternate wireless access network when the user interface system infers that the user desires the mobile device to implement the alternate wireless access network mode, and wherein the one or more settings include identifications or addresses of predetermined access points; and
   a connection subsystem capable of connecting the mobile device to an alternate wireless access network, wherein the alternate wireless access network operates on licensed, semilicensed or unlicensed wireless spectrum, and wherein the connection subsystem comprises:
      a scanning component configured to determine one or more available alternate wireless access networks to be connected to the mobile device; and
      an alternate wireless access network ordering component configured to order the determined one or more alternate wireless access networks based on a measure of network signal strength,
      wherein the connection subsystem connects to a one of the alternate wireless access networks highest in the order of alternate wireless access networks, and either adds the identification and address of the alternate wireless access network to a database stored in the mobile device or prompts the user whether to add identifications or addresses of the determined one or more alternate wireless access networks to a database stored in the mobile device.

2. The mobile device of claim 1, wherein the user interface subsystem further comprises:
   an informational display component, the informational display component containing information related to providing a user with one or more help screens, wherein the help screens describes one or more elements of the alternate wireless access network mode of the mobile device, and
   wherein further the informational display component chooses which help screen to display to the user based on input received by the user.

3. A method of connecting a mobile device to an alternate wireless access network, the method comprising:
   during at least one of the initial powering on of the mobile device, each powering on of the mobile device, and in response to user input, querying a user about whether to connect to an alternate wireless access network supported by the mobile device; and
   upon receiving an indication from the user of the mobile device to proceed with connection to the alternate wireless access network, initiating connection of the mobile device to the alternate wireless access network by:
  searching for available alternate wireless access networks to be accessed by the mobile device;
  determining one or more available alternate wireless access networks to be accessed by the mobile device; and
  ordering the determined one or more available alternate wireless access networks by a measure of network signal strength,
  wherein the mobile device connects to the available alternate wireless access network highest in the order of determined one or more available alternate wireless access networks.

4. The method of claim 3, wherein the mobile device is one of a mobile handset, personal digital assistant, or laptop computer.

5. The method of claim 3, wherein the alternate wireless access network is an IEEE 802.11a, IEEE 802.11b, IEEE 802.11g or IEEE 802.11n network.

6. The method of claim 3, wherein the alternate wireless access network is one of an IEEE 802.16 network, an IEEE 802.20 Mobile Broadband Wireless Access network, an Ultra Wideband network, or a Bluetooth network.

7. The method of claim 3, wherein identification information related to the alternate wireless access network is already stored in a database of the mobile device.

8. The method of claim 3, wherein the alternate wireless access network is a secure network, further comprising:
  querying a user to input security credentials, wherein the security credentials enable the mobile device to connect to the secure network.

9. The method of claim 3, wherein the alternate wireless access network is a secure network, further comprising:
  upon receiving input from the user, obtaining security credentials from an associated router, wherein the security credentials enable the mobile device to connect to the secure network.

10. The method of claim 3, further comprising:
  upon receiving an indication from the user of the mobile device to not proceed with the connection to the alternate wireless access network, querying the user whether to attempt to connect to an alternate wireless access network the next time the mobile device is powered on.

11. The method of claim 10, further comprising:
  displaying to the user an information display screen related to alternate wireless access networks, wherein the device chooses the information display screen based on whether the user wishes to attempt to connect to an alternate wireless access network the next time the mobile device is powered on.

12. The method of claim 3, further comprising:
  before connecting the mobile device to an available alternate wireless access network, displaying to the user a tutorial related to alternate wireless access networks.

13. The method of claim 3, wherein a database of the mobile device contains identification information related to at least a local area network accessible by public users and a local area network accessible by private users.

14. The method of claim 3, wherein connecting the mobile device to the alternate wireless access network further comprises:
  querying the user regarding whether to add the alternate wireless access network to an alternate wireless access network list stored on the mobile device when the alternate wireless access network is not already stored in the alternate wireless access network list; and
  adding the alternate wireless access network to the alternate wireless access network list upon receiving an indication from the user to add the alternate wireless access network.

15. A communication device for establishing communications with at least one cellular telephone system and with an access point of an alternate wireless access network, the communication device comprising:
  an antenna;
  a microphone;
  at least one wireless transceiver, coupled to the antenna, for wirelessly exchanging signals between the communication device and at least one access point of the alternate wireless access network, and between the communication device and the cellular telephone system;
  memory means for storing data;
  a portable power generation subsystem;
  an audio portion for processing voice signals;
  processor means, coupled among the microphone, the transceiver, the audio portion, the portable power generation subsystem and the memory, for permitting wireless communication, in a first mode, with the alternate wireless access network over at least a local wireless link to the alternate wireless access network, and, in a second mode, with the cellular telephone system;
  a housing configured to carry the antenna, microphone, transceiver, portable power generation subsystem, memory, audio portion and processor means; and
  a user interface means, carried by the housing and coupled to the processor means, for providing a user-interface to permit user activation of the communication device, and
  wherein the processor means includes:
    means for automatically identifying any predetermined alternate wireless access networks in response to activation of the communication device, wherein identifiers for the predetermined alternate wireless access networks are stored in the memory means;
    means for automatically identifying available alternate wireless access networks, wherein the identified available alternate wireless access networks can include open and closed alternate wireless access networks; and
    means for at least semi-automatically creating an ordered list of any identified predetermined alternate wireless access networks and any identified available alternate wireless access networks,
    wherein the network list is ordered in accordance with a measure of network signal strength, and wherein identified predetermined alternate wireless access networks have a priority over any identified available alternate wireless access networks.

16. The communication device of claim 15 wherein the activation of the communication device includes powering up of the device, and
  wherein the predetermined alternate wireless access networks are alternate wireless access networks having predetermined identifiers or addresses, or predetermined identifiers or addresses falling within a predetermined range.

17. The communication device of claim 15, wherein the processor means further comprises:
  means for automatically querying a user if the user is interested in wireless communication with the alternate wireless access network in the first mode based on a user input; and
  means for automatically providing information to the user about implementing wireless communication with the alternate wireless access network in the first mode, and for at least temporarily disabling initiation of the means for automatically identifying any predetermined alternate wireless access networks or of the means for automatically identifying available alternate wireless access networks.

18. The communication device of claim 15, wherein the processor means further comprises:
means for providing to a user a tutorial on wireless communication with the alternate wireless access network in the first mode.

19. The communications device of claim 15, wherein the means for automatically identifying any predetermined alternate wireless access networks employs wildcard matching to identify alternate wireless access networks having predetermined identifiers or addresses.

20. A tangible computer-readable medium whose contents cause at least one mobile device to perform a method to automatically establish communications with at least one cellular telephone system through at least one alternate wireless access network, the method comprising:
at the mobile device, automatically identifying at least one available alternate wireless access network,
wherein the mobile device is configured to provide voice communications over the cellular telephone system, and configured to provide voice communications with the cellular telephone system through at least a local connection with at least one alternate wireless access network;
at the mobile device, automatically analyzing a status of, or connection with, an identified alternate wireless access network; and
at the mobile device, providing a user a tutorial on wireless communication describing one or more elements of the alternate wireless access network mode of the device and querying the user regarding whether to add the identified alternate wireless access network to an alternate wireless access network list stored on the mobile device.

21. The computer-readable medium of claim 20 wherein the automatically identifying is performed after one of several initial activations of the mobile device.

22. The computer-readable medium of claim 20 wherein the method further comprises:
at the mobile device, prompting the user whether to provide information on establishment of communications with the cellular telephone system through an alternate wireless access network or whether to perform the automatically identifying.

23. The computer-readable medium of claim 20 wherein the automatically identifying includes identifying open and secure alternate wireless access networks, and wherein the automatically analyzing includes determining whether a key or code is required for network access.

24. The computer-readable medium of claim 20 wherein the automatically analyzing includes wirelessly retrieving a key or code from a secure alternate wireless access network to permit access to the secure alternate wireless access network.

* * * * *

UNITED STATES PATENT AND TRADEMARK OFFICE
CERTIFICATE OF CORRECTION

PATENT NO. : 7,646,745 B2  Page 1 of 1
APPLICATION NO. : 11/480821
DATED : January 12, 2010
INVENTOR(S) : Caldwell et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 521 days.

Signed and Sealed this

Sixteenth Day of November, 2010

David J. Kappos
*Director of the United States Patent and Trademark Office*